United States Patent [19]

Kaneko et al.

[11] 4,251,854
[45] Feb. 17, 1981

[54] LIGHT ANGLE INDICATOR OF PHOTOGRAPHIC FLASH

[75] Inventors: Yoshikazu Kaneko, Shijyonawate; Takashi Suzuka; Tadahide Okuno, both of Osaka, all of Japan

[73] Assignees: Matsushita Electric Industrial Co., Ltd., Osaka; West Electric Company, Ltd., Kadoma, both of Japan

[21] Appl. No.: 73,244

[22] Filed: Sep. 6, 1979

[30] Foreign Application Priority Data

Sep. 13, 1978 [JP] Japan .................. 53/113193

[51] Int. Cl.³ .............. G03B 15/02; H01J 61/80; F21K 5/00
[52] U.S. Cl. .................. 362/5; 354/127; 354/128; 354/289
[58] Field of Search .............. 362/5; 356/139, 257; 354/127, 128, 145, 289

[56] References Cited

U.S. PATENT DOCUMENTS

| 3,391,622 | 7/1968 | Steisslinger et al. | 362/5 |
| 3,635,135 | 1/1972 | Ambraschla et al. | 362/5 |

FOREIGN PATENT DOCUMENTS

| 37-13939 | 9/1962 | Japan | 362/5 |
| 966557 | 8/1964 | United Kingdom | 362/5 |

*Primary Examiner*—Benjamin R. Padgett
*Assistant Examiner*—Irwin Gluck
*Attorney, Agent, or Firm*—Cushman, Darby & Cushman

[57] ABSTRACT

In a light angle indicator of photographic flash having a main part containing at least a flash lamp and a front lens part slidably coupled to said main part, the improvement is that
 the light angle indicator comprises
 a first indicator panel fixed to said main part and having obliquely disposed transparent regions or windows and
 a second indicator panel fixed to said front lens part and having obliquely disposed bright marked regions
 either of said windows or said bright marked regions having marks or numerals to indicate light coverage angles.

3 Claims, 9 Drawing Figures

LIGHT ANGLE INDICATOR OF PHOTOGRAPHIC FLASH

BACKGROUND OF THE INVENTION

1. Field of the Invention:

The present invention relates to an indicator of light coverage angle of a photographic flash capable of changing the light coverage angle.

2. Description of the Prior Art

Hitherto in a photographic flash capable of changing angle of the flash light, a means to indicate light angle is provided by being linked with movement of its slidable front lens part. Such prior art is disclosed for instance in the United States Patent Application Ser. No. 925,629.

One example of such prior art configuration is elucidated with reference to FIG. 1(A), FIG. 1(B), FIG. 2(A) and FIG. 2(B).

In FIG. 1(A) which is a plan view of the prior art device, FIG. 1(B) which is a sectional elevation view taken at the sectional plane b—b shown in FIG. 1(A) and FIG. 2(A) and FIG. 2(B) which are plan views, the main body 1 contains flash lamp part 3 comprising a gas discharge lamp 31 and a reflector 32 and printed circuit part 101 which contains electric circuit components 104 constituting known photo-flash circuit. A slidable front lens part 2 having a Fresnel lens 4 is slidably provided on the front hood 102 of the main body 1. The slidable front lens part 2 has, in unitary extended relation, a mask plate 9 having three small windows 5, 6 and 7. The mask plate 9 is slidably inserted under the top cover plate 103, which has a large window 11. Under the mask plate 9 is further provided a fixed plate 105, on the upper face of which letters W, N, and T, corresponding to the setting for a wide angle, normal angle and telephoto angle, are printed.

Operation of the prior art device of FIG. 1(A), FIG. 1(B), FIG. 2(A) and FIG. 2(B) is as follows: By sliding in or out the slidable front lens part 2, the angle of the flash light coverage is changed from wide angle to telephoto angle. When the front lens part 2 is in the most pushed-in position, as shown in FIG. 1(A), the small window 5 lies on the letter W of the fixed plate 105 thereby showing the letter W therethrough. Then, by drawing out the slidable front lens part 2 to the state shown in FIG. 2(A), the next small window 6 comes on the next letter N of the fixed plate 105 thereby showing the letter N therethrough. Lastly, when the slidable front lens part 2 is further drawn out to the state shown in FIG. 2(B), the last small window 7 comes on the letter T thereby showing the letter T therethrough. Thus, by selecting the positions of the letters W, N or T being shown through the windows 5, 6 or 7, coverage angle of the flash light is selected to be wide, normal or telephoto, respectively, In such prior art device, there is a shortcoming that the mask plate 9 should have a considerable length $l_1$ which is larger than the distance $l_2+l_3+l_4$, which is sum of pitch between the windows 5 and 6, pitch between the windows 6 and 7 and width of a window, respectively. Hence, the length of the mask plate 9 becomes considerably longer than the sliding stroke of the slidable front lens part 2. Accordingly, in order to receive the mask plate 9, the size of the main part 1 necessarily becomes large.

In the prior art apparatus of FIG. 1(A), FIG. 1(B), FIG. 2(A) and FIG. 2(B), there would be a modification wherein the order of the arrangement of the letters W, N and T be inversed. However, such modified apparatus resultantly requires larger size than the prior art apparatus.

SUMMARY OF THE INVENTION

The object of the present invention is to provide a photographic flash with an improved light angle indicator capable of making the size of the flash smaller.

The object of the present invention is realized by arranging indication regions of indication panels linked to the main part and the slidable front lens part in inverse stepwise or inverse oblique relation with respect to sliding motion of the slidable front lens part.

DESCRIPTION OF THE PREFERRED EMBODIMENT

The photographic flash in accordance with the present invention has a light indicator comprising a first indicator panel linked to a main part containing at least a flash lamp and having obliquely disposed regions and a second indicator panel linked to a slidable front lens part and having inverse-obliquely disposed regions, said first indicator panel and said second indicator panel being slidably and superposedly disposed with each other, thereby a region of said first indicator panel and a region of said second indicator panel which are superposed each other forming a mark which is differently noticeable from rest of regions, said mark changing responding with change of relative position of said slidable front lens part with respect to said main part.

Figure 1:
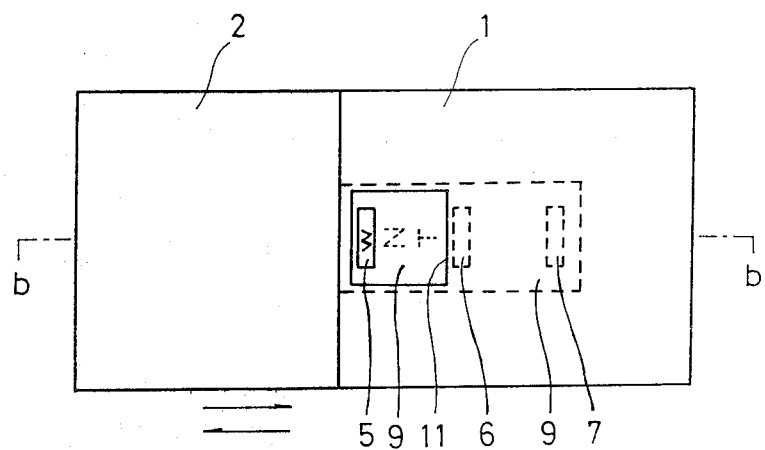
FIG. 1(A) is a plan view of a prior art showing a state of selection of a wide angle.
FIG. 1(B) is a sectional elevation view taken at a sectional plane b—b shown in FIG. 1(A).
Figure 1:
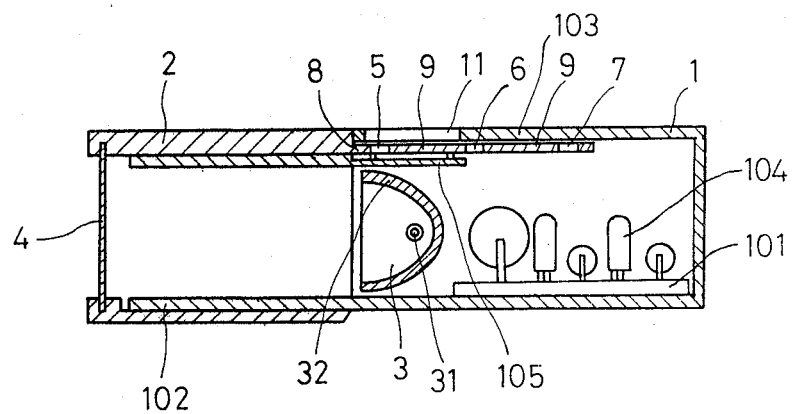
Figure 2:
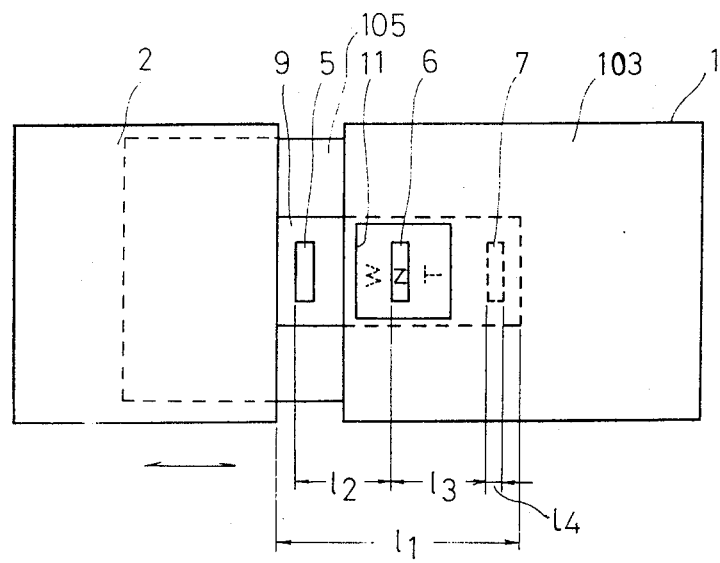
FIG. 2(A) is a plan view of the prior art in a state of selection of a normal angle.
FIG. 2(B) is a plan view of the prior art in a state of selection of a telephoto angle.
Figure 2:
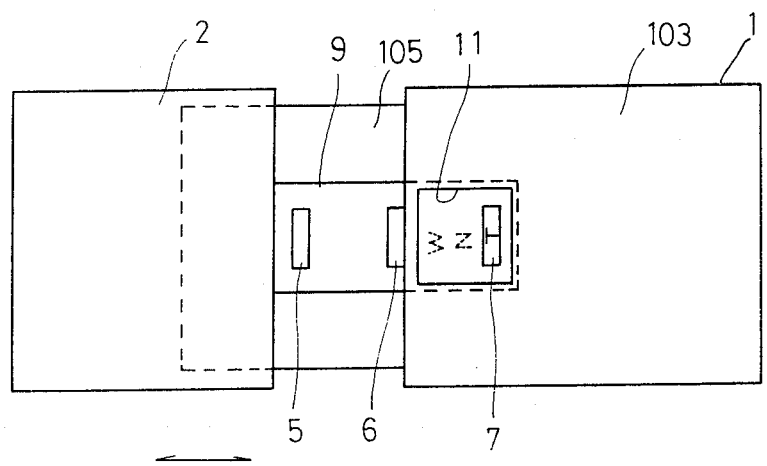
Figure 3:
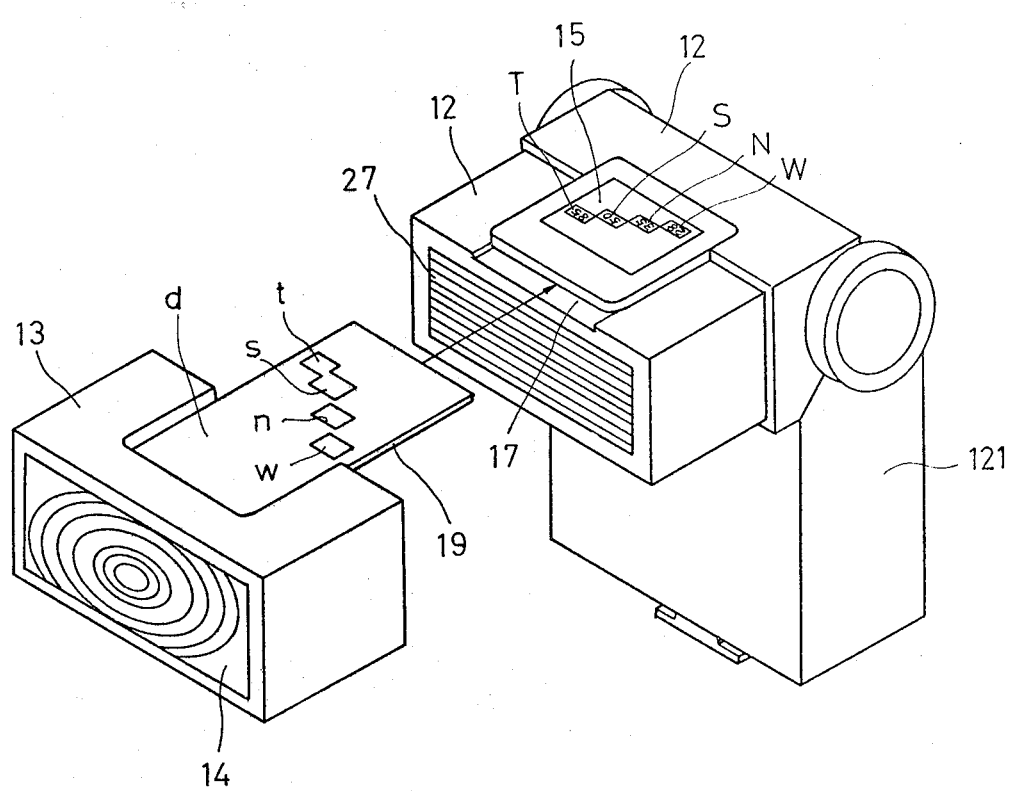
FIG. 3 is a fragmental perspective view of a photographic flash embodying the present invention.
Figure 4:
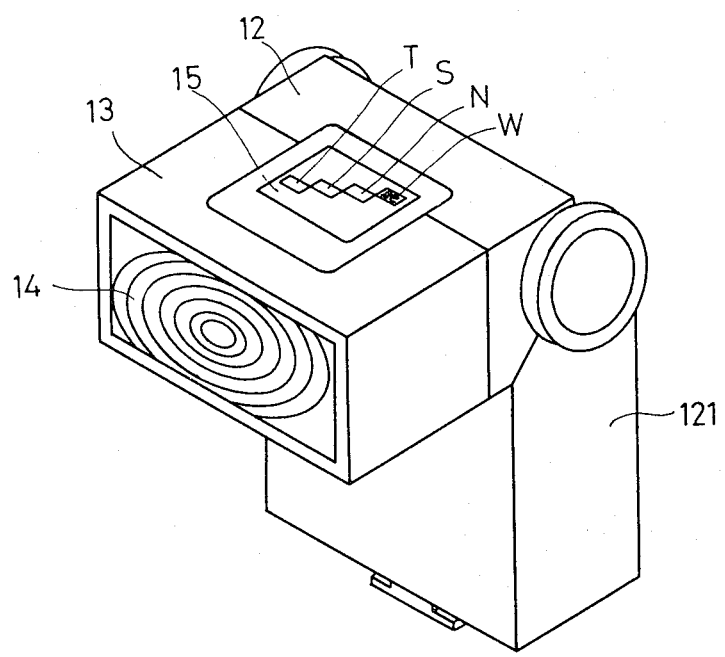
FIG. 4 is a perspective view of the photographic flash of FIG. 3 in an assembled state, and in a selection of a wide angle.

In FIG. 3, FIG. 4, FIG. 5(A) and FIG. 5(B), which show a first embodiment of the present invention, a main part 12 contains a known flash lamp part comprising a gas-discharge lamp and a reflector behind a protecting and light-beam regulating first Fresnel lens 27. The main part 12 also contains printed circuit board on which necessary circuit components are fixed. On the top face of the main part 12, a first indicator panel 15 is provided with a narrow slit 17 thereunder. The main part 12 is rotatably mounted on a battery container part 121. A main capacitor for storing electric charge to be fed to the gas-discharge lamp is also provided in the container part 121. On a slidable front lens part 13 is provided a second indication panel 19, in such a position as to be inserted into the narrow slit 17 when said slidable front lens part 13 is slidably mounted on the front part of the main part 12 as shown in FIG. 4.

The first indication panel 15 has stepwisely or obliquely disposed four small regions W, N, S and T. In this embodiment the four regions W, N, S and T are transparent windows formed on black indication panel 15. On the transparent windows W, N, S and T, numerals to indicate light angles 28, 35, 50 and 85 are printed with dark color paint.

The second indication panel 19 has stepwisely or obliquely disposed four small regions w, n, s and t. In this embodiment, the four regions are bright colored regions surrounded by dark-colored space region d.

The slidable front lens part 13 is then mounted on the main part 12 in a manner that the second indication panel 19 is inserted in the slit 17 under the first indication panel 15.

Figure 5:
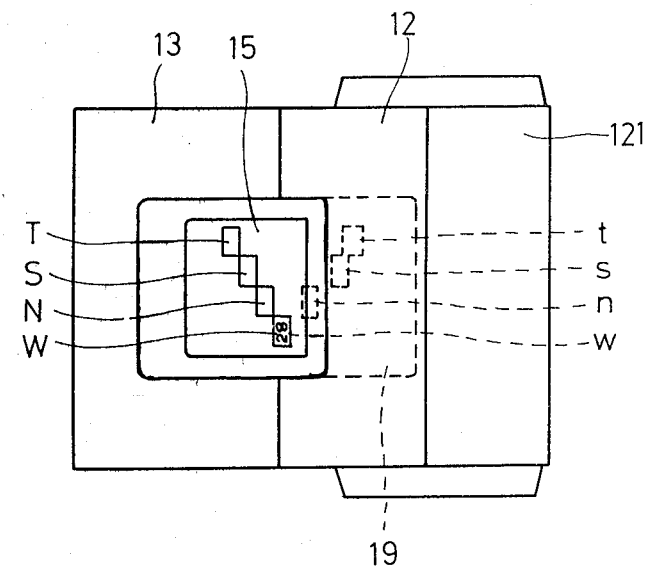
FIG. 5(A) is a plan view of the apparatus of FIG. 4.
FIG. 5(B) is a plan view of the apparatus of FIG. 3 in a state of selection of telephoto angle.
Figure 5:
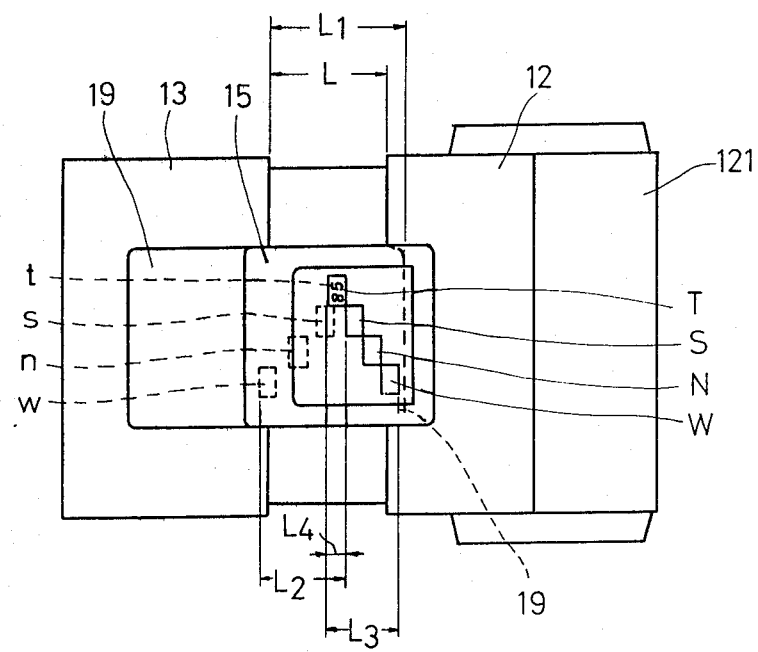

Operation of the apparatus of the present invention shown in FIGS. 3, 4, 5(A) and 5(B) is as follows:

In the state of FIG. 4 and FIG. 5(A), the front lens part 13 is set to the most pushed-in position, where light coverage angle becomes the widest. In this position, as shown in FIG. 5(A), the region w namely a bright colored part w of the second indication panel 19 comes immediately underneath the region W namely the window W of the first indication panel 15. Accordingly, only the indication of the numeral 28, which indicates use of a wide lens 28 for 36 mm×24 mm picture frame, is clearly represented on the bright colored region w, and other numerals printed by dark paint on the transparent regions N, S and T can not be clearly observed, since these numerals are now backed by the dark colored space region d of the second indication panel 19. Then, as the front lens part 13 is drawn out of the main part 12, the regions n, s and t in turn comes under the regions N, S and T, thereby in turn representing the numerals of corresponding focal length 35, 50 and 85 only, respectively. FIG. 5(B) shows the state when numeral 85 on the region T is represented.

Now, the stroke L of the sliding in and out of the slidable front lens part 13 is elucidated.

By defining that:

L is the full stroke of the sliding movement of the front lens part, $L_1$ is the length of second indication panel 19 of the example.

$L_2$ is the overall distance covering the four regions w, n, s and t of the second indication panel 19, $L_3$ is the distance covering the four regions W, N, S and T of the first indication panel 15, and $L_4$ is the length in the sliding direction of the regions. Then the following relation holds:

$$L = L_2 + L_3 - L_4$$

In this example, the length of the second indication panel 19 is selected sufficiently long in order that the dark colored end part of the indication panel 19 still lies under the windows W, N, and S even when the slidable front lens part 13 is most drawn out. However, the second indication plate 9 can be shorter. At the shortest case the length of the second indication panel 19 can be only a little beyond the farthest region t. By using dark colored plate in the gap 17 underneath the first indication panel 15, such short indication panel can be used without diminishing above clear indication of numerals. By means of the abovementioned reason, a short second indication panel 19 suffice, and therefore the overall size of the apparatus can be made small.

Figure 6:
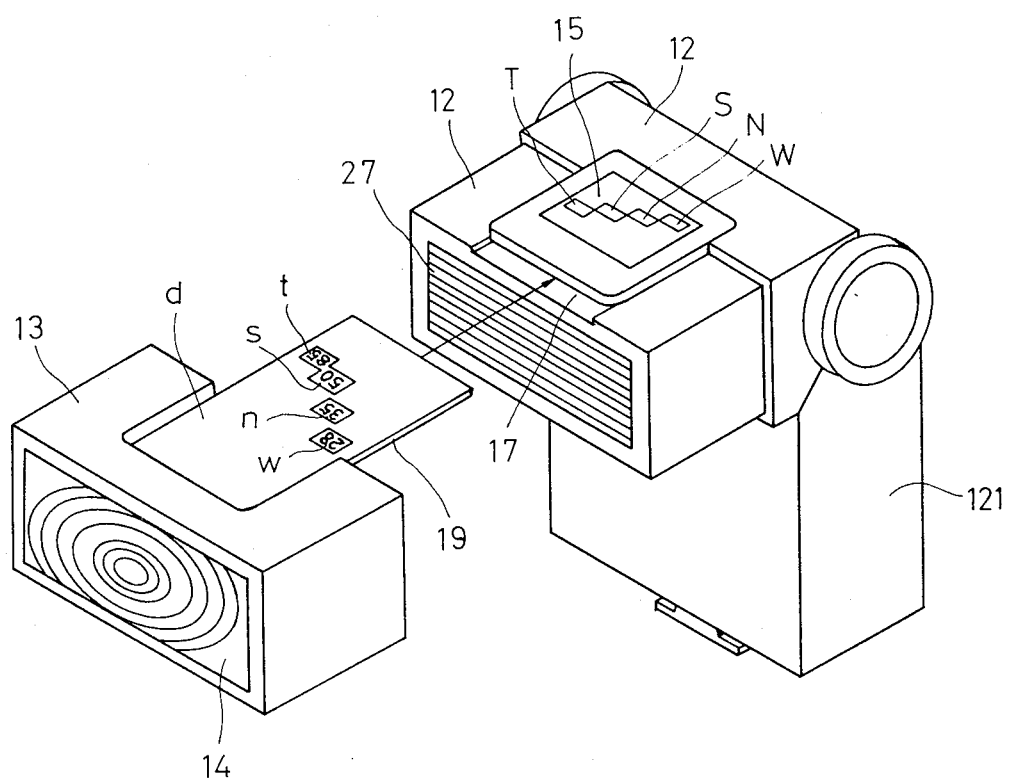
FIG. 6 is a fragmental perspective view of a second embodiment of photographic flash of the present invention.

FIG. 6 shows another embodiment wherein first indication panel 15 and the second indication panel 19 are modified a little. That is, contrary to the first embodiment, regions w, n, s and t of the second indication panel 19 has numerals 25, 35, 50 and 85, respectively, and the regions W, N, S and T of the first indication panel is formed as simple transparent windows. Such construction also assures similar operation.

In a further modification, regions of either or both of the indication panels 15 and 19 can be made into a continuous oblique band. In such modified embodiment, the indication can be made by the region represented by superposing of a region and a part of the oblique band or by the region represented by superposed or crossing of two inversely oblique bands.

In the embodiments, the indications of the angles in the regions of the first or the second indication panel are made by numerals representing the focal length, but the indication also can be made by known marks W, N, S and T, or W, N and T.

What we claim is:

1. A light angle indicator of photographic flash having a main part containing at least a flash lamp and a front lens part which is slidably coupled to said main part so as to vary distance between said lamp part and a lens of said front lens part, the improvement is that the light angle indicator comprises a first indicator panel linked to said main part and having obliquely disposed regions and a second indicator panel linked to said slidable front lens part and having inverse-obliquely disposed regions, said first indicator panel and said second indicator panel being slidably and superposedly disposed with each other, thereby a region of said first indicator panel and a region of said second indicator panel which are superposed each other forming a mark which is differently noticeable from rest of regions, said mark changing responding with changes of relative position of said slidable front lens part with respect to said main part.

2. A light angle indicator in accordance with claim 1 wherein said oblique disposed regions of said first indicator panel are transparent windows having numerals or marks for the corresponding angles thereon and said oblique disposed regions of said second indicator panel are regions of bright color in dark colored background space.

3. A light angle indicator in accordance with claim 1 wherein said oblique disposed regions of said first indicator panel are transparent windows and said obliquely disposed regions of said second indicator panel are regions having numeral or marks for the corresponding angles thereon.

* * * * *